E. HOPKINSON
March 4, 1930. MANUFACTURE OF TIRE CASINGS Re. 17,618
Original Filed Dec. 27, 1926 3 Sheets-Sheet 1
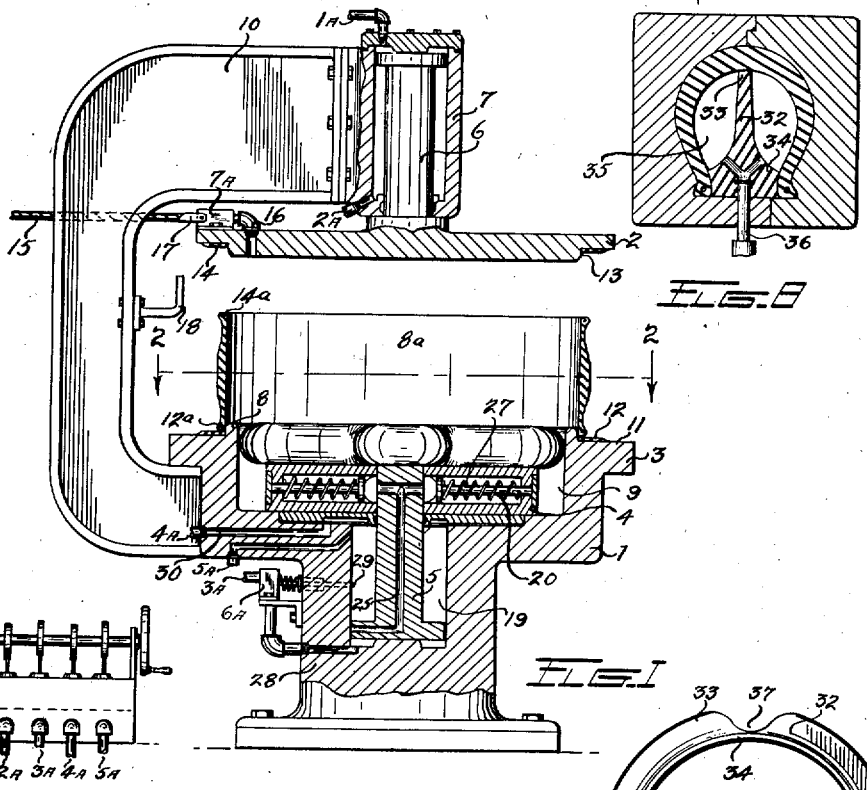
FIG. 1
FIG. 8
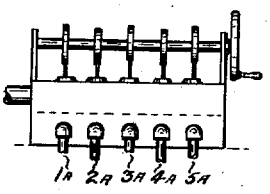
FIG. 10
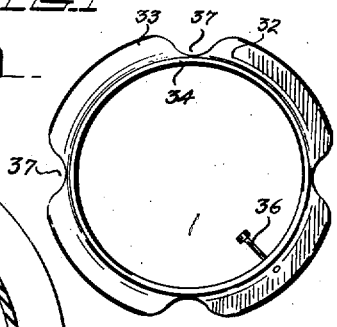
FIG. 9
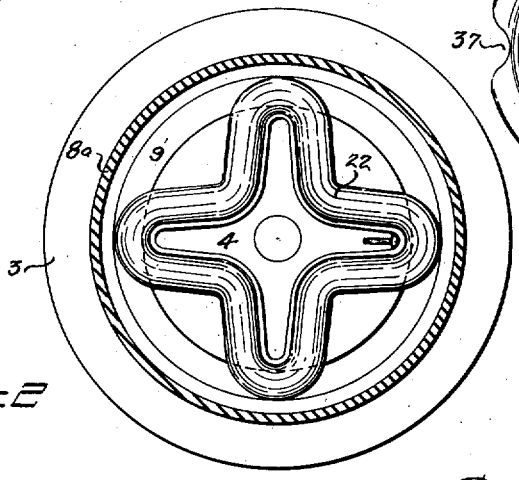
FIG. 2
Inventor
Ernest Hopkinson March 4, 1930. E. HOPKINSON Re. 17,618
MANUFACTURE OF TIRE CASINGS
Original Filed Dec. 27, 1926 3 Sheets-Sheet 2
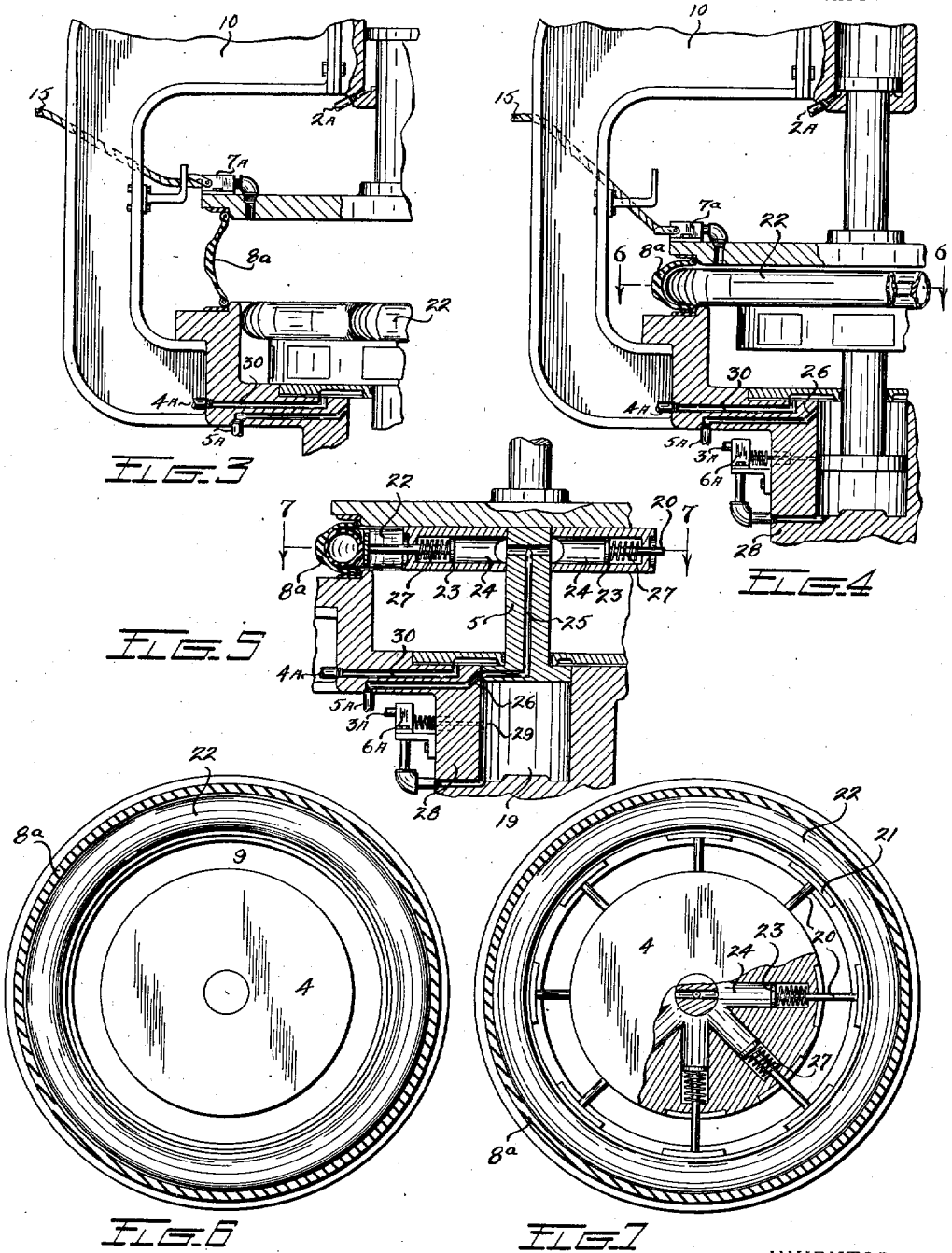
INVENTOR
Ernest Hopkinson March 4, 1930. E. HOPKINSON Re. 17,618

MANUFACTURE OF TIRE CASINGS

Original Filed Dec. 27, 1926 3 Sheets-Sheet 3

INVENTOR
Ernest Hopkinson
BY
Walter S. Pipes
ATTORNEY

Reissued Mar. 4, 1930 Re. 17,618

UNITED STATES PATENT OFFICE

ERNEST HOPKINSON, OF NEW YORK, N. Y.

MANUFACTURE OF TIRE CASINGS

Original No. 1,713,658, dated May 21, 1929, Serial No. 157,110, filed December 27, 1926. Application for reissue filed August 30, 1929. Serial No. 389,597.

This invention relates to an improved apparatus and method for the manufacturing of tire casings and more particularly to that of forming unshaped tire casings or so-called "pulley bands" into approximately tire shape.

Such tire casings are built up on drums, preferably flat or crowned, and thereafter must be shaped to conform to that of the ordinary tire. The term "pulley band," which will be used throughout the specification, indicates a tire casing which has been built up on a flat drum. It is common practice to shape pulley band casings by a mechanical expander of the segmental type or by means of vacuum, but heretofore it has not been the practice to shape the pulley band into tire form and at the same time insert an air bag therein so that a tire upon being removed from the tire shaping apparatus will hold its new shape and be ready for the vulcanizing mold.

This invention has for its principal object to provide an apparatus of the character hereinafter described which will positively locate an air bag or other flexible member within the tire casing so that a tire when removed from its shaping apparatus will hold and retain its tire shape due to the member contained therein.

Another object is to provide an apparatus for simultaneously shaping a tire from the pulley band and positioning a flexible member therein by a quick, cheap and satisfactory method.

Further objects and advantages of this invention will be apparent from the following specification considered in connection with the accompanying drawings, in which:

Fig. 1 is a sectional view showing the apparatus in its normal position of rest with pulley band and air bag properly inserted preparatory to being combined;

Fig. 2 is a transverse section on the line 2—2 of Fig. 1;

Fig. 3 is a fragmentary view showing a portion of the apparatus in Fig. 1 in substantially the first position of work;

Fig. 4 is a fragmentary view similar to Fig. 3 showing the pulley band in its tire shape and an air bag elevated to be positioned therein.

Fig. 5 is a fragmentary view of Fig. 4 showing a positive means for seating the air bag within the tire by the use of laterally extending pistons;

Fig. 6 is a transverse view partially in section on the line 6—6 of Fig. 4;

Fig. 7 is a transverse section, further parts being broken away, taken on the line 7—7 of Fig. 5;

Fig. 8 is a transverse section of a shaped pulley band with a modified flexible member therein;

Fig. 9 is a plan view of the modification shown in Fig. 8;

Fig. 10 is a side elevation of a valve mechanism used in connection with the tire shaping apparatus.

Figure 11:
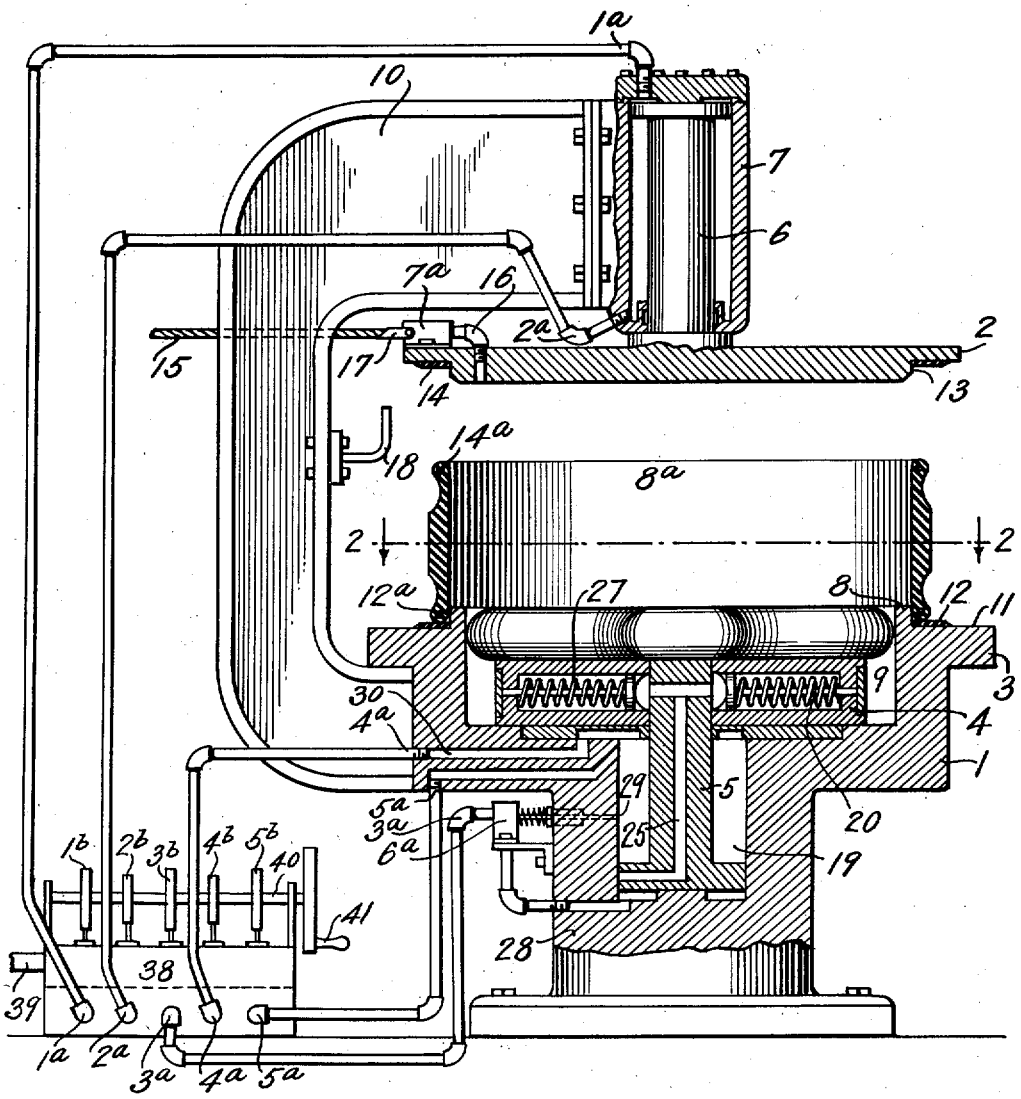
Fig. 11 is an assembled view partially in elevation and partially in section of the apparatus shown in Figs. 1 and 10.

Referring to Fig. 1 of the drawings, the apparatus comprises a base member 1, an upper platen 2 and a lower platen 3. The lower platen 3 is cylindrically recessed to provide space for a table 4, said table being supported upon a ram 5. The upper platen 2 is secured to a ram 6 contained within the chamber 7 and adapted to be lowered and raised by means of fluid pressure which is controlled alternately through valves $1^a$ and $2^a$ respectively. Chamber 7 is secured to a platen support 10, being bolted thereto, said support extending downwardly and forming an integral part of the lower or base member 1. An annular groove 11 is cut into the upper face of platen 3 and a fluid sealing washer 12 is secured within said annular groove. An annular groove 13 similar to 11 is cut into the under face of platen 2 and has a fluid sealing washer 14 corresponding to that on the lower platen 3.

Secured to the upper face of platen 2 is a valve $7^a$ having a flexible hose inlet 15 and an outlet 16 passing therethrough and communicating directly with the under face of platen 2. This valve is opened by any upward movement of the lever 17 located thereon and is shown in Fig. 1 in its closed position.

Secured to the support 10 a finger 18 extends out and into the line of travel of lever 17 when platen 2 is lowered. The downward movement of platen 2, as shown in Fig. 3, brings lever 17 of the valve $7^a$ into engagement with finger 18, thereby opening said valve and allowing fluid to pass through platen 2 into the space therebeneath. Further downward movement of platen 2 draws the lever 17 below finger 18 and out of engagement therewith allowing said lever to return to its first position, thus closing valve $7^a$.

Positioned by an annular guide 8 extending upward from platen 3 is a pulley band $8^a$, the bead $12^a$ of which rests against the guide 8 and upon the sealing washer 12. The uppper bead $14^a$ will, when platen 2 is lowered, fit against a similar sealing ring 14 positioned in the annular groove 13. By bringing platen 2 into engagement with the bead $14^a$ of the pulley band $8^a$, a fluid tight chamber is created, into which at any time table 4 may be projected without disturbing either the fluid pressure therein or the pulley band itself. At a point in the downward movement of the platen 2 just prior to its engagement with the pulley band $8^a$, the valve $7^a$ will be actuated and as the platen seats upon bead $14^a$, the fluid flowing thereinto will tend to cause the band $8^a$ to assume a convex outline. This curvature is due to valve $7^a$ being opened and continues only during the downward travel of lever 17 on finger 18, and since this travel is short the pulley band $8^a$ will receive an initial curvature due to the fluid pressure, there being generally no object in continuing the pressure from within to create a greater bulge in the pulley band. However, it will be apparent that the parts may be so designed that pressure from the outside may continue to be admitted through the entire shaping operation. The balance of force exerted upon the pulley band $8^a$ is by means of platen 2 when actuated in a downward direction and continues until said pulley band is in substantially its tire shape, as indicated in Fig. 4. This operation of bulging or shaping the pulley band is accomplished by the combined effect of the pressure on its edges and the compression of the entrapped air.

The table 4 when in a position of rest, as indicated in Fig. 1, lies within a cylindrical recess 9 cut into platen 3, and rests upon the floor of said recess. The ram 5 secured at one end to the table 4 extends downwardly into a chamber 19 located within the base of the apparatus and may be alternately raised and lowered by means of fluid pressure controlled through valves $3^a$ and $4^a$ respectively. The table 4 has within it a plurality of horizontal pistons 20, each piston having an enlarged head 21 slightly arced to conform to the curved inner face of an inflatable bag 22 against which they are to exert pressure under conditions which will later be described. The inner end of each piston has a head 23 and is adapted to be moved radially from the center of the table within a piston chamber 24. The chamber 24 directly communicates with a passage 25 within the ram 5, said passage at its other end communicating with a passage 26 in the platen 3. A valve $5^a$ controls the passage of fluid through passages 26, 25 and chamber 24. The pistons 20 are returned to their position of rest within table 4 by the expansion of springs 27 previously compressed by the radial movement of the pistons as soon as fluid pressure within the chamber 24 is cut off.

Secured to the lower outside face of the base platen 3 is a valve $6^a$ and is adapted to act upon and partially cut off or retard the fluid supply which raises ram 5 when the valve $3^a$ is open. The valve $6^a$ has an actuating pin 29 projecting through the wall of the base 28 and terminating within chamber 19. Upon each stroke of the ram 5 within the chamber 19 the flange member of the ram will engage the pin 29 forcing it within the wall 28. This movement of the pin is directly communicated to the valve $6^a$, partially closing it. Since the valve $6^a$ is in the same fluid line as that controlled by the valve $3^a$ whenever valve $3^a$ is opened, fluid may pass through the valve $6^a$ into the chamber 19 rapidly elevating the ram 5 until the flange of said ram reaches and acts against pin 29. The pin 29 upon being moved will partially cut off the fluid passing through valve $6^a$ thereby slightly retarding the upward movement of the ram 5 at approximately midway of its stroke. Upon the downward stroke of ram 5, fluid pressure is being exerted through the line 30 and is controlled by valve $4^a$. It may be seen that inasmuch as the fluid pressure is not being exerted past valve $6^a$ upon the downward stroke of ram 5, that when said ram passes pin 29 no change in the speed of the stroke will occur.

Another type of flexible member for supporting and sealing the edges of a tire prior to and during its vulcanization is that shown in Figs. 8 and 9 in which 32 indicates the flexible member. This member 32 has a central projecting portion 33 terminating at the inner circumference in an enlarged portion 34 which acts to seal the edges of the pulley band $8^a$ creating a fluid tight chamber 35 within said pulley band. Access to the chamber 35 is accomplished by means of a valve 36 which joins the interior with the exterior of the pulley band, said valve being sufficiently long to pass through the tire mold within which the pulley band is positioned. Referring to Fig. 9 it will be noted that the portion 33 of the flexible member 32 has four indentations 37 at diametrically opposite points in its circumference which permits of easy collapsing and facilitates insertion within a pulley band.

Referring to Figs. 1, 10 and 11, the valve mechanism comprises a chest 38 which is attached to a supply pipe 39 leading to a compressor, not shown. The several valves $1^a$ to $5^a$, inclusive, are mounted in the chest and are actuated by cams $1^b$ to $5^b$, inclusive, rigidly mounted on a shaft 40. The shaft 40 is actuated by a handle 41. The valves within the chest 38 are so arranged that when they are not opened to allow fluid to pass into them from the pipe 39, they are open to atmosphere to allow any fluid under pressure within said apparatus to return to normal pressure. The valves are connected by pipe lines to the respective ports of the apparatus so that upon manipulation of the handle 41, the several valves in the chest are actuated in sequence to supply fluid under pressure to the different ports to cut off the supply of fluid under pressure in accordance with the proper operating sequence of the apparatus.

*Operation.*—In operation a pulley band is positioned horizontally upon the platen 3 against an annular guide 8. An air bag or other shaping member 22 is distorted so that it will fit within the chamber 9 upon the table 4 as shown in Fig. 2. The necessary parts being in place, the valve mechanism may now be operated. The first valve to be opened is $1^a$. Opening this valve allows fluid to pass into the head of the cylinder 7 and forces the ram 6, carrying the platen 2, in a downward direction toward engagement with the upper edge of the pulley band. Just prior to the contact of platen 2 with the pulley band, valve $7^a$, located upon the top and near the edge of the platen 2, is operated by means of a lever located thereon striking against finger 18 secured to the support 10. This opening of the valve $7^a$ permits fluid to flow through the outlet 16 in the platen 2 into the nearly enclosed space within the pulley band. By the time valve $7^a$ is completely opened, platen 2 has been lowered sufficiently to seal against the upper face of the pulley band and create a fluid tight chamber which with continued fluid pressure exerted through the passage in platen 2 will tend to bulge the pulley band (as indicated in Fig. 3). Upon further downward movement of platen 2, valve $7^a$ will close, since the lever controlling it will now have passed beyond finger 18, secured to the wall 10, and as platen 2 continues downward to its extreme lowered position (indicated in Fig. 4) it will bulge or press the pulley band into tire shape.

During this process of lowering platen 2 to compress the pulley band, an action of the other parts has been in progress, namely, that of the ram 5 moving upward and carrying with it upon the face of the table 4 the air bag 22. At a point approximately half-way of the ram's upward stroke, the face of the table will be in horizontal alignment with the annular guide 8. Since the air bag 22 is made of a resilient material, such as rubber, and is buckled when inserted within chamber 9, and is maintained in said buckled condition while within chamber 9, it will expand immediately into substantially its normal shape upon being raised above the ananular guide 8. Due to the retarding action of the valve $6^a$ upon the fluid which is elevating ram 5, by means of pin 29 partially closing valve $6^a$ when the flange of the ram engages said pin, said ram will hesitate long enough to allow the air bag to assume its normal shape as clearly indicated in Fig. 6. Ram 5 now having risen past the pin 29 permits said pin to snap back into its normal position by the action of a small spring secured thereto and opens wide valve $6^a$ thus allowing full fluid pressure to again be exerted on the under face of ram 5 carrying it to the end of its upward stroke. At this point, it will be noticed that the passageway 25 in the ram 5 is directly in line with the passage 26 controlled by the valve $5^a$ and upon the opening of said valve, fluid is communicated by means of these passages to the chamber 24 and there acts upon the heads 23 of the pistons located within table 4 extending them radially to engage the air bag 22, as indicated in Fig. 7. This act of forcing the enlarged head 21, of each piston 20, against the inner circumference of the air bag 22, tends to firmly seat the air bag within the tire shaped pulley band, overcoming any tendency of said air bag to buckle or kink. The air bag now being properly positioned within the pulley band, valve $5^a$ is closed and the springs are free to exert their pressure to return the pistons 20 to their normal positions of rest within table 4. Valves $2^a$ and $4^a$ are now opened simultaneously and, as a result, the platen 2 is raised from its engagement with the pulley band and the table 4 is lowered to its normal position within chamber 9. The pulley band, now in tire form being so held by the air bag contained therein, may be removed. The operation is now complete and by properly placing another pulley band and an air bag within the apparatus may be repeated in the manner just described.

While only one embodiment is shown and described, it is obvious that many modifications may be made without departing from the spirit and scope of my invention and I intend therefore to include all such modifications as are comprehended in the accompanying claims.

Having thus described my invention, what I claim and desire to protect by Letters Patent is:—

1. An apparatus for shaping tires from pulley bands comprising in combination means cooperating to shape a pulley band, means for locating a unitary retaining member within said pulley band, and means coacting with said member for securing positive engagement between said shaped pulley band and said retaining member.

2. An apparatus for shaping tires from pulley bands comprising in combination platens cooperating to shape a pulley band located therebetween, means for actuating at least one of said platens, means for locating a unitary retaining member within said pulley band, and means coacting with said member for securing positive engagement between said shaped pulley band and said retaining member.

3. An apparatus for shaping tires from pulley bands comprising in combination means cooperating to shape a pulley band, means for locating a unitary retaining member concentrically within said pulley band, and means coacting with said member for securing positive engagement of said retaining member with the pulley band.

4. An apparatus for shaping tires from pulley bands comprising in combination means cooperating to shape a pulley band, means for aligning a unitary retaining member within said band and means coacting with said member to cause the same to be bodily moved into engagement with and seal the space between the edges of said pulley band to form a fluid sealed chamber within the pulley band.

5. An apparatus for shaping tires from pulley bands comprising in combination a pair of platens coacting to shape a pulley band located therebetween, and means for actuating said platens; means for aligning a flexible and resilient member within said band and means coacting with said member to cause the same to be moved into positive engagement within the shaped pulley band to maintain its imparted shape.

6. An apparatus for shaping tires from pulley bands comprising a base, an annular platen integral therewith, said platen being provided with a cylindrical recess, a movable table situated therein, fluid pressure operable means to actuate said table, means to position a retaining member in horizontal alignment with a pulley-band, an upper platen located in vertical alignment with said annular platen, and means for lowering said upper platen into fluid sealing and pressure engagement with a pulley band therebeneath to shape said pulley band into tire form.

7. In a tire shaping apparatus, the combination of two platens one of which is movable toward the other to compress an endless pulley band, positioned therebetween into tire shape, a table located within one of said platens, means for projecting said table upwardly from within said platen to position an air bag contained thereon in proper relation with the pulley band, and means for forcing said air bag into positive nested relation with said shaped pulley band.

8. In a tire shaping apparatus, the combination of two platens, at least one of which is movable toward the other to compress an endless pulley band into tire shape, a table located within the fixed platen, means for elevating said table to position an air bag contained thereon, a plurality of horizontal pistons contained within said table, and means for forcing said pistons radially into positive engagement with an air bag to position said air bag within the formed tire.

9. A tire shaping apparatus comprising a fixed platen, a movable platen located directly thereover, means for lowering said upper platen into fluid sealing and pressure engagement with a pulley band positioned upon the face of said fixed platen, a table located within said fixed platen, an air bag contained thereon, means for elevating said table from within the fixed platen to properly position said air bag with relation to the shaped tire, and means for forcing said air bag into the tire.

10. An apparatus for shaping pulley bands into tire form comprising a set of vertically aligned horizontal platens adapted to compress a pulley band inserted therebetween into approximately tire shape, the lower platen being provided with a concentric cylindrical recess, a movable table within said recess, said table containing a plurality of horizontally positioned pistons, and fluid pressure means for actuating said pistons.

11. An apparatus for shaping pulley bands into approximately tire form comprising a horizontal base platen, said platen being provided with a concentric cylindrical recess therein, a table within said recess operated by a ram, fluid pressure means acting to raise said table at different speeds and to lower said table, a plurality of pistons within said table and means for radially extending and retracting said pistons with relation to the table, an upper horizontal platen in vertical alignment with said base plate suspended by a ram, fluid pressure means to lower and raise said upper platen with respect to the base platen, said means cooperating to compress a pulley band into approximately tire shape and to locate a unitary retaining member therein.

12. An apparatus for shaping tires from pulley bands comprising in combination means cooperating to shape the pulley band, means for locating a unitary retaining member within said pulley band, and means coacting with the inner periphery of said member to cause said member to be moved into positive engagement with the interior of the shaped pulley band.

13. An apparatus for shaping tires from pulley bands comprising in combination differential fluid pressure means cooperating to shape the pulley band to approximately tire form, and means for locating a unitary fluid pressure-container within the pulley band after it has been shaped to approximately tire form to retain it so shaped.

14. In a tire shaping apparatus, the combination with members adapted to make substantially fluid tight joints with the two edges of a flat endless tire band and to form therewith a drum shaped chamber, one of which members at least is adapted to be moved towards and away from the other, of means for holding an inflatable bag in a confined position during the relative movement of said members while shaping said band, and means for releasing said bag from the holding means and thereby nesting it within a shaped endless tire band to sustain it in shape before and after removal from the apparatus.

15. In a tire shaping apparatus, the combination with a pair of platens adapted to make substantially fluid tight joints with the two edges of a flat endless tire band and to form therewith a drum shaped chamber, one of which platens at least is adapted to move towards and away from the other, of means for holding an inflatable bag in a confined position during the relative movement of said platens while shaping said band and for releasing the bag and nesting it within the shaped endless tire band to sustain the latter in shape before and after removal of the band from the apparatus.

16. In a tire shaping apparatus, the combination with a pair of platens adapted to make substantially fluid tight joints with the two edges of a flat endless tire band and to form therewith a drum shaped chamber, one of which platens at least is adapted to be moved towards and away from the other, of circular means provided in one of the platens for holding an inflatable bag in a collapsed position during the relative movement of said platens while shaping said band, and means for releasing said bag in position to nest within the resulting shaped endless tire band before the band is removed from the platens and for removal therewith.

17. In a tire shaping apparatus, the combination with a pair of relatively movable means adapted to make substantially fluid tight joints with the two edges of a flat endless tire band, one of said means being provided with a space for releasably holding a detached collapsed air bag, means for causing relative movement between said band engaging means to at least in part shape a tire band disposed therebetween, and means for moving said air bag in a direction substantially parallel to the direction of movement of one of said platens from said holding space into position to nest with the shaped tire band.

18. In a tire shaping apparatus, the combination with a pair of relatively movable means adapted to make substantially fluid tight joints with the two edges of a flat endless tire band, one of said means being provided with a space communicating with the space between said relatively movable means and within said band for releasably holding a detached collapsed air bag, means for causing relative movement between said band engaging means to at least in part shape a tire band disposed therebetween, and means for moving said air bag from said holding space into position to nest with the shaped tire band, said last mentioned means being movable axially of said tire band.

19. In a tire shaping apparatus, the combination with a pair of relatively movable means adapted to make substantially fluid tight joints with the two edges of a flat endless tire band, one of said means being provided with a space communicating with the space between said relatively movable means and within said band for releasably holding a detached collapsed air bag, means for causing relative movement between said band engaging means to at least in part shape a tire band disposed therebetween, and means for pushing said air bag from said storage space into position to nest with the shaped tire band.

20. A combined air bag inserting and tire shaping machine comprising means for engaging the beads of a "flat built" tire casing, means for moving an airbag from a position without to a position within the casing and means for pneumatically shaping the casing.

21. A combined airbag inserting and tire shaping machine comprising a movable head having means for engaging one bead of a "flat built" casing, a cylinder having means adapted for engaging the other bead positioned adjacent the movable head, means for relatively moving the head and cylinder axially of each other, a member shiftably mounted within the cylinder to move a collapsed airbag to a position within the inner periphery of the casing and means to shape the tread portion of the casing before the airbag has been positioned therein.

22. A combined airbag inserting and tire shaping machine comprising a movable head having flanges for engaging one bead of a "flat built" tire casing, a cylinder having flanges for engaging the other bead of the casing, means for admitting compressed fluid into the cylinder, and means for advancing a collapsed airbag within the inner periphery of the casing.

23. A machine for inserting airbags into flat-built pneumatic tire casings and for shaping the tread portion thereof comprising means for engaging the beads of "flat built" tire bands, means for advancing an airbag from a position without to a position within the inner periphery of the casing and means for shaping the tread portion thereof.

24. In a tire shaping apparatus, the combination of relatively movable pressing members adapted to make substantially fluid-tight joints with the two edges of a substantially flat endless tire band and to form therewith a substantially hermetically sealed chamber, one of said pressing members being provided with a recess opening into said chamber adapted to receive a bag and to maintain around said bag the tire shaping pressure of said chamber, and means for transferring said bag from said recess into said chamber.

25. In a tire shaping apparatus, the combination of relatively movable pressing members adapted to make substantially fluid-tight joints with the two edges of a substantially flat endless tire band and to form therewith a substantially hermetically sealed chamber, one of said pressing members being provided with a recess opening into said chamber adapted to receive a detached bag and to maintain the bag in a collapsed condition, and means for transferring said bag from said recess into said chamber.

Signed at New York, county and State of New York, this 29th day of August, 1929.

ERNEST HOPKINSON.